United States Patent Office 3,384,672
Patented May 21, 1968

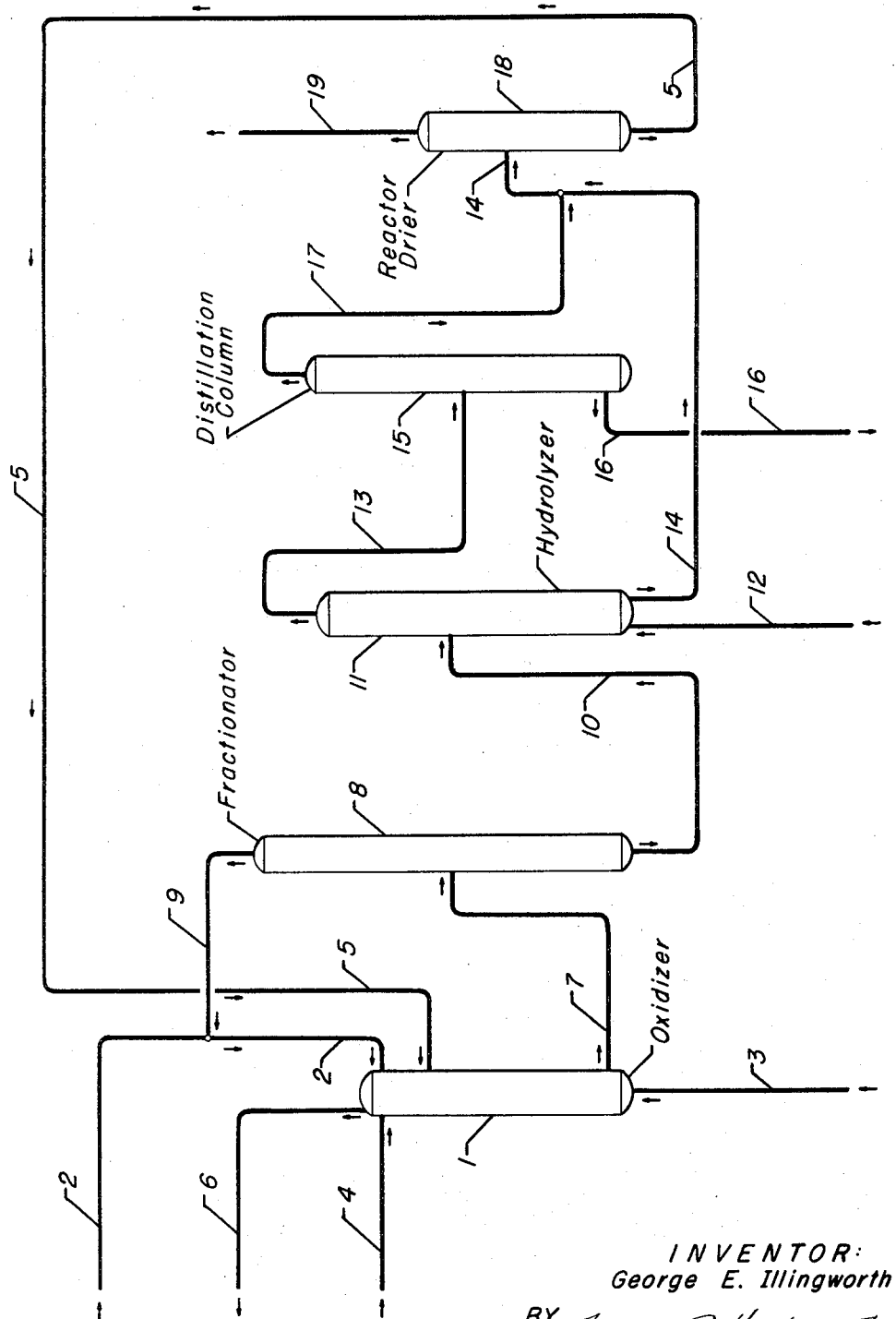

3,384,672
PREPARATION OF ALCOHOLS
George E. Illingworth, Mount Prospect, Ill., assignor to Universal Oil Products Company, Des Plaines, Ill., a corporation of Delaware
Filed Apr. 12, 1965, Ser. No. 447,506
3 Claims. (Cl. 260—631)

This invention relates to a novel process for the oxidation of saturated hydrocarbons to form alcohols and, in particular, to a novel process for inhibiting the formation of higher oxidation products.

Alcohols, particularly the $C_6+$ alcohols, are extensively employed as solvents in medicinal and cosmetic preparations, in perfume manufacture, as extractants and solvents for materials in lacquers and varnishes, as alkylating agents in the preparation of synthetic detergents, and as intermediates in organic synthesis, for example, in the manufacture of plasticizers for synthetic resins.

The controlled oxidation of saturated hydrocarbons, utilizing atmospheric oxygen as an oxidizing agent, presents a relatively inexpensive means of producing alcohols. However, the oxidation reaction product resulting from the oxidation of saturated hydrocarbons invariably comprises a mixture of first, second and third stage oxidation products, e.g., alcohols, aldehydes, ketones, carboxylic acids, and the like. In the production of alcohols it is of course desirable to inhibit the oxidation reaction beyond the first stage of oxidation. This has been accomplished by incorporating a trapping agent in the oxidation reaction mixture, substantially anhydrous boric acid and/or boric oxide being generally considered as most effective. The borate ester which is formed inhibits further oxidation and is subsequently hydrolyzed to yield the desired alcohol product and boric acid in aqueous solution. The boric acid and/or boric oxide must thereafter be recovered in substantially anhydrous form prior to further utilization as a trapping agent.

Substantially anhydrous boric acid and/or boric oxide is a solid material forming a heterogeneous reaction mixture with the hydrocarbon reactant. It is highly desirable to utilize a trapping agent which forms a homogeneous reaction mixture with the hydrocarbon reactant to effect better contact and more efficient trapping of the alcohol product.

It is an object of this invention to present a novel process for the controlled oxidation of hydrocarbons to form alcohols. It is another object to present a novel trapping agent, an alkyl metaborate, which forms a homogeneous reaction mixture with the hydrocarbon reactant. It is a further object to present a process utilizing an alkyl metaborate trapping agent in a continuous type of operation in a novel manner to maximize the yield of desired alcohol product.

In one of its broad aspects the present invention embodies a process for converting a saturated hydrocarbon to an alcohol which comprises reacting said hydrocarbon, an alkyl metaborate and air at oxidation reaction conditions, said alkyl metaborate being characterized in that the alkyl substituent thereof is a derivative of a hydrocarbon other than the saturated hydrocarbon starting material, hydrolyzing the resulting oxidate and forming an alcohol derivative of the saturated hydrocarbon starting material, an alcohol derivative of the alkyl metaborate and aqueous boric acid, separating and recovering the alcohol derivative of the saturated hydrocarbon starting material, combining the alcohol derivative of the alkyl metaborate with the aqueous boric acid, reacting the same and re-forming the alkyl metaborate, recovering said alkyl metaborate in a substantially anhydrous state and recycling the same to be further reacted with the saturated hydrocarbon starting material and air as hereinbefore described.

A more specific embodiment relates to a process for converting a saturated hydrocarbon to an alcohol and comprises reacting said hydrocarbon, an alkyl metaborate and air at a temperature of from about 100° C. to about 225° C., said alkyl metaborate being characterized in that the alkyl substituent thereof is a derivative of a hydrocarbon containing a lesser number of carbon atoms than the saturated hydrocarbon starting material, hydrolyzing the resulting oxidate and forming an alcohol derivative of the saturated hydrocarbon starting material, an alcohol derivative of the alkyl metaborate and aqueous boric acid, separating and recovering the alcohol derivative of the saturated hydrocarbon starting material, combining the alcohol derivative of the alkyl metaborate with the aqueous boric acid, reacting the same at a temperature of from about 80° C. to about 250° C. and re-forming the alkyl metaborate, recovering said alkyl metaborate in a substantially anhydrous state and recycling the same to be further reacted with the saturated hydrocarbon starting material and air as hereinabove described.

Other objects and embodiments of this invention will become apparent in the following detailed specification and with reference to the accompanying drawing.

The description of the process of this invention is presented with reference to a schematic flow diagram shown in the accompanying drawing. The description with reference to the schematic flow diagram is for the purpose of illustration only and it is contemplated that other modifications which may be beyond the scope of the schematic flow diagram may be practiced without departing from the generally broad scope of this invention as set out in the appended claims.

Pursuant to the process of this invention, a saturated hydrocarbon is reacted with an alkyl metaborate and air at oxidation reaction conditions. Accordingly, there is included in the schematic flow diagram an oxidizer 1 wherein the saturated hydrocarbon, charged thereto by way of line 2, air, charged thereto by way of line 3, and the alkyl metaborate, initially charged thereto by means of line 4 and thereafter by way of line 5, are reacted.

Saturated hydrocarbons utilized as starting materials preferably contain from about 4 to about 20 carbon atoms and include alicyclic as well as aliphatic saturated hydrocarbons. Suitable saturated hydrocarbons include butane, isobutane, pentane, isopentane, and the various structural isomers of hexane, heptane, octane, decane, dodecane, tetradecane, pentadecane, etc., and also cyclopentane, methylcyclopentane, cyclohexane, methylcyclohexane, cyclooctane, cyclodecane, cyclododecane, and the like.

Oxidation reaction conditions applicable to the process of this invention have been described in the art. Reaction conditions relate principally to temperature. Pressure is employed to maintain the hydrocarbon in the liquid phase and in many cases atmospheric pressure or autogenous pressure developed during the course of the oxidation reaction is sufficient. While the temperature at which the reaction is carried out may be from about 100° C. to about 225° C. or more, preferably not exceeding the boiling point of the hydrocarbon at reaction conditions, it is more preferably in the range of from about 140° C. to about 180° C. It is desirable to limit the contact time of the reactants in order to effect substantially less than complete conversion of the hydrocarbon charge per pass. For example, it is desirable to maintain the reactants in contact at reaction conditions for a period of from about 1 to about 10 hours while maintaining a relatively low conversion level preferably not exceeding about 30% conversion per pass. The oxidation rate is more readily controlled utilizing molecular oxygen in the form of air or other oxygen-containing gas. It is further preferred to utilize at least a slight stoichiometric excess of alkyl metaborate relative to the hydrocarbon conversion level maintained in the oxidizer.

The alkyl metaborate utilized pursuant to this invention is characterized in that the alkyl substituent thereof is a derivative of a hydrocarbon other than the saturated hydrocarbon starting material. Thus, the alkyl substituent may contain a greater or lesser number of carbon atoms than the hydrocarbon starting material. Also, the alkyl substituent may differ from the hydrocarbon starting material in that one is an isomer of the other, or that one is aliphatic while the other is alicyclic. For example, when the hydrocarbon starting material is dodecane, suitable alkyl metaborates include n-butyl metaborate, sec-butyl metaborate, t-butyl metaborate, n-pentyl metaborate, sec-pentyl metaborate, etc., and also the hexyl, heptyl, octyl, nonyl, decyl, and undecyl metaborates as well as alkyl metaborates wherein the alkyl substituent contains more than 12 carbon atoms as in the case of tridecyl metaborate, etc. Suitable alkyl metaborates would further include those containing an alicyclic alkyl substituent, for example, cyclopentyl metaborate, cyclohexyl metaborate, cyclooctyl metaborate, cyclodecyl metaborate, cyclododecyl metaborate, and the like. It is preferred to utilize an alkyl metaborate characterized in that the alkyl substituent thereof contains a lesser number of carbon atoms than the hydrocarbon starting material.

Referring again to the schematic flow diagram, molecular oxygen, preferably in the form of air diluted with nitrogen, is charged to the oxidizer 1 by means of line 3 and passes upwardly through a turbulent mass of hydrocarbon and alkyl metaborate, excess gas being vented overhead through line 6. The gas stream further serves to strip the water of reaction from the oxidation reaction mixture substantially as it is formed.

The oxidizer effluent, comprising unconverted hydrocarbon and oxidate, is withdrawn through line 7 and charged to a fractionator 8. The oxidate comprises reaction products of the hydrocarbon starting material, alkyl metaborate and air. It is characterized in that it comprises alkoxy groups in approximately a 2:1 ratio with boron. For example, it is contemplated that the oxidate comprises dialkyl boric acid, dialkyl boric acid anhydride and the like, and also trialkyl borate and alkyl metaborate in admixture such that the alkoxy-boron ratio is approximately 2:1 as aforesaid. However, regardless of the exact nature of the oxidate, it composition is such that upon hydrolysis it yields aqueous boric acid and substantially equimolar amounts of an alcohol derivative of the hydrocarbon starting material and an alcohol derivative of the aforementioned alkyl metaborate as will hereinafter appear.

In the fractionator 8, unconverted hydrocarbon is distilled overhead and recycled to the oxidizer 1 by way of line 9 and line 2 as a portion of the hydrocarbon feed thereto. The oxidate is recovered from the fractionator 9 by way of line 10 as the higher boiling fraction and passed through line 10 to the hydrolyzer 11.

In the hydrolyzer 11, the oxidate is treated with water admitted thereto via line 12 and hydrolyzed to form an alcohol derivative of the hydrocarbon starting material, an alcohol derivative of the alkyl metaborate and aqueous boric acid. The first mentioned alcohol, hereinafter referred to as product alcohol, is recovered through line 13 as the upper of two immiscible liquid layers in the hydrolyzer 11, the lower liquid layer comprising boric acid. The second mentioned alcohol, hereinafter referred to as non-product alcohol, is recovered from the hydrolyzer 11 as a portion of the upper and/or lower liquid layer. The distribution of non-product alcohol in the upper and/or lower liquid layer is of course dependent upon the particular alcohols involved, which is in turn dependent upon the particular hydrocarbon starting material and alkyl metaborate employed. However, the exact distribution of non-product alcohol in the upper and/or lower liquid layer of the hydrolyzer is of no particular concern since the non-product alcohol is subsequently combined with the lower liquid layer as hereinafter described, and since an alkyl metaborate selected as herein provided will result in a non-product alcohol readily distilled from the upper layer product alcohol.

The upper liquid layer comprising product alcohol is withdrawn from the hydrolyzer 11 by way of line 13 as aforesaid, and passed through line 13 to a distillation column 15. The distillation column 15 is provided for the separation and recovery of product alcohol from any non-product alcohol which may have been present in the upper immiscible layer of the hydrolyzer 11. In the schematic flow diagram, the product alcohol is treated as the higher boiling fraction and recovered through line 16. The non-product alcohol is shown recovered overhead in line 17 and passed therethrough to combine with the aqueous boric acid withdrawn from the hydrolyzer 11 by way of line 14, and the combined streams are continued through line 14 to the drier 18.

The drier 18 is maintained at conditions effecting the reaction of boric acid and the non-product alcohol to reform the alkyl metaborate, and at conditions effecting the separation of water from the reaction mixture. The former reaction is conveniently effected at a temperature in the range of from about 80° C. to about 250° C., said temperature range also being suitable for the separation of water. Water is of course suitably separated at reduced pressure, in which case a temperature of at least 50° C. should be employed to effect the reaction of boric acid with the non-product alcohol at a suitable rate. An overhead line 19 is provided for the removal of water from the drier 18. The alkyl metaborate is recovered from the drier through line 5 and recycled to the oxidizer 1 as a trapping agent for the alcohol product subsequently formed therein.

Ordinarily, approximately 50 mole percent of the product alcohol must be retained in the process to be reacted with boric acid and re-form the alkyl metaborate trapping agent. The alkyl metaborate thus formed is dried and thereafter recycled to the oxidizer. It is this sequence of steps which most adversely affects product yield. The loss resulting therefrom is particularly acute in those instances where valuable hydrocarbon starting materials are utilized to manufacture still more valuable alcohol products such as the $C_8+$ alcohols. The present process obviates or substantially minimizes losses attributed to the described factors. By the process of this invention, substantially all of the hydrocarbon starting material is recovered as the desired alcohol product and the alkyl metaborate is reformed, not from the more valuable product alcohol, but from a relatively inexpensive alcohol formed by hydrolysis of the oxidate and readily separated from the product alcohol. In this manner, any losses which occur in the deforming, drying and recycling of the alkyl metaborate are unrelated to the hydrocarbon starting material or the alcohol derivative thereof. Thus, in one preferred embodiment of this invention relating to the production of dodecyl alcohol, dodecane is reacted with sec-butyl metaborate and air at a temperature of from about 140° C. to about 180° C. forming sec-butyldodecyl boric acid. The sec-butyldodecyl boric acid reaction product is hydrolyzed forming dodecyl alcohol, sec-butyl alcohol and aqueous boric acid. The dodecyl alcohol is separated and recovered and the sec-butyl alcohol is combined with the aqueous boric acid and reacted therewith at a temperature of from about 80° C. to about 250° C., reforming the sec-butyl metaborate. Said sec-butyl metaborate is thereafter recovered in a substantially anhydrous state and recycled to the oxidizer to be further reacted with the dodecane starting material and air as hereinbefore described.

Alcohols prepared according to the process of this invention generally contain minor amounts of ketone and/or aldehyde oxidation products. The carbonyl portion of the alcohol product is readily converted to the alcohol by treating the alcohol product in admixture with hydrogen in contact with a hydrogenation catalyst at hydrogenation reaction conditions. The alcohol product may be treated at hydrogenation conditions generally described in the art. For example, the ketone and/or aldehyde portion of the alcohol product is readily hydrogenated to the alcohol utilizing a hydrogenation catalyst such as copper, zinc oxide, chromium oxide, manganese oxide, nickel oxide, etc., and also noble metal catalysts like platinum, palladium, or other oxides. Hydrogenation temperatures are generally in the range of from about 25° C. to about 250° C. The ratio of hydrogen to ketone and/or aldehyde employed is usually expressed in terms of the partial pressure of hydrogen and may be from about 10 to about 4000 pounds per square inch gauge depending on the nature of the alcohol product. In general, increased pressure will result in an increased rate of reaction.

The following examples are presented in illustration of certain specific embodiments of the process of this invention and are not intended to serve as an undue limitation on the generally broad scope of the invention as set out in the appended claims.

Example I

In this example, 8.18 grams of boric oxide, 30.11 grams of 2-octanol and 200 grams of n-dodecane were stirred together and heated at reflux temperature. The water of reaction was continuously removed from the reaction mixture by recovering the same as an azeotropic mixture in an overhead condenser and returning the organic phase to the reactor. At the completion of the reaction the resulting solution was transferred to an oxidation reactor. An oxidizing stream consisting of 10% oxygen and 90% nitrogen was passed through the stirred solution for 6 hours while maintaining the temperature at 165° C. It was found that n-dodecane had undergone conversion to the extent of 13%. The ratio of dodecanols to dodecanones in the hydrolyzed oxidate was 10:1.

Example II

A n-dodecane solution of 2-octyl metaborate was prepared as follows. Into a 22 liter flask equipped with stirrer and Dean Stark trap was added 954 grams of boric oxide, 3572 grams of 2-octanol and 6400 grams of n-dodecane. The mixture was heated at the reflux temperature until metaborate formation was complete as evidenced by complete disappearance of boron oxide and the recovery of 248 ml. of water. The resulting n-dodecane solution was subjected to oxidation in a continuous flow reactor. The conditions employed in this operation were:

| | |
|---|---|
| Temperature | 165° C. |
| Liquid feed | 29.3 cc./hr. |
| Gas rate | 0.451 ft.³/hr. |
| Oxygen content | 2.7% $O_2$. |
| Pressure | Atmospheric. |

The product shows 14.9% total conversion of n-dodecane to give a mixture of dodecanols and dodecanones in 82.6% yield.

One liter of the product is hydrolyzed three times with a total of 1000 ml. of water. The organic layer is distilled to yield a fraction containing n-dodecane and 2-octanol and a second fraction containing dodecanones and dodecanols. The first fraction is placed in a flask equipped with addition funnel, stirrer and Dean Stark trap and brought to reflux. The aqueous solution of boric acid recovered from hydrolysis is then added dropwise. Water is removed and 2-octyl metaborate is formed. The resulting solution is oxidized with the result being substantially that obtained in Example I.

I claim as my invention:

1. A process for converting a cyclic or acyclic saturated hydrocarbon containing from about 4 to about 20 carbon atoms to an alcohol which comprises:
   (a) reacting said saturated hydrocarbon, an alkyl metaborate and air at oxidation reaction conditions including a temperature of from about 100° C., to about 225° C., said alkyl metaborate being characterized in that the alkyl substituent thereof is an alkyl or alicyclic radical of not more than 13 carbon atoms and is a derivative of a hydrocarbon other than the saturated hydrocarbon starting material,
   (b) hydrolyzing the resulting oxidate and forming an alcohol derivative of the saturated hydrocarbon starting material, an alcohol derivative of the alkyl metaborate and aqueous boric acid, said alcohol derivatives being formed in approximately equimolar amounts,
   (c) separating and recovering the alcohol derivative of the saturated hydrocarbon starting material, reacting the alcohol derivative of the alkyl metaborate with the aqueous boric acid at a temperature of from about 50° C. to about 250° C. while continuously removing water from the reaction mixture, and reforming the alkyl metaborate,
   (d) recovering said alkyl metaborate in a substantially anhydrous state and recycling the same to be further reacted with a saturated hydrocarbon starting material and air as hereinabove described.

2. A process for converting dodecane to dodecyl alcohol which comprises:
   (a) reacting said dodecane, sec-octyl metaborate and air at a temperature of from about 140° C. to about 180° C.
   (b) hydrolyzing the resulting oxidate and forming dodecyl alcohol, a sec-octyl alcohol and aqueous boric acid, the dodecyl alcohol and the sec-octyl alcohol being formed in approximately equimolar amounts,
   (c) separating and recovering the dodecyl alcohol, reacting the sec-octyl alcohol with the aqueous boric acid at a temperature of from about 80° C. to about 250° C. while continuously removing water from the reaction mixture and re-forming the sec-octyl metaborate,
   (d) recovering said sec-octyl metaborate in a substantially anhydrous state and recycling the same to be further reacted with the dodecane starting material and air as hereinabove described.

3. A process for converting cyclohexane to cyclohexyl alcohol which comprises:
   (a) reacting said cyclohexane, sec-butyl metaborate and air at a temperature of from about 140° C. to about 180° C.,
   (b) hydrolyzing the resulting oxidate and forming cyclohexyl alcohol, sec-butyl alcohol and aqueous boric acid, the cyclohexyl alcohol and the sec-butyl alcohol being formed in approximately equimolar amounts,
   (c) separating and recovering the cyclohexyl alcohol, reacting the sec-butyl alcohol with the aqueous boric acid at a temperature of from about 80° C. to about 250° C. while continuously removing water from the reaction mixture and re-forming the sec-butyl metaborate.
   (d) recovering said sec-butyl metaborate in a substantially anhydrous state and recycling the same to be further reacted with the cyclohexane starting material and air as hereinabove described.

(References on following page)

References Cited

UNITED STATES PATENTS

| | | |
|---|---|---|
| 2,587,753 | 3/1952 | O'Connor et al. __ 260—617 XR |
| 2,721,180 | 10/1955 | Laurence et al. |
| 3,072,704 | 1/1963 | Carpenter et al. _____ 260—462 |
| 3,202,694 | 8/1965 | Kirshenbaum et al. ___ 260—639 |
| 3,230,245 | 1/1966 | Binning et al. _____ 260—639 |
| 3,238,238 | 3/1966 | McNamara et al. __ 260—462 X |

FOREIGN PATENTS

| | | |
|---|---|---|
| 939,534 | 10/1963 | Great Britain. |
| 627,084 | 7/1963 | Belgium. |

BERNARD HELFIN, *Acting Primary Examiner.*

LEON ZITVER, *Examiner.*

H. T. MARS, *Assistant Examiner.*